United States Patent [19]

Bentjens

[11] Patent Number: 4,464,086
[45] Date of Patent: Aug. 7, 1984

[54] HOB WITH CUTTING PLATES

[75] Inventor: Bernd Bentjens, Schwarzenbek, Fed. Rep. of Germany

[73] Assignee: Wilhelm Fette GmbH, Schwarzenbek, Fed. Rep. of Germany

[21] Appl. No.: 311,297

[22] Filed: Oct. 14, 1981

[30] Foreign Application Priority Data

Oct. 16, 1980 [DE] Fed. Rep. of Germany ....... 3039076

[51] Int. Cl.$^3$ ............................................. B26D 1/12
[52] U.S. Cl. ....................................... 407/25; 407/52; 407/63
[58] Field of Search ................................... 407/25–29, 407/20, 23, 24, 52, 63, 59, 12, 31, 35, 43

[56] References Cited

U.S. PATENT DOCUMENTS

| | | | |
|---|---|---|---|
| 1,495,067 | 5/1924 | Conklin | 407/25 |
| 2,310,826 | 2/1943 | Adams | 407/44 |
| 3,242,553 | 3/1966 | Bogsten | 407/52 |
| 3,303,554 | 2/1967 | Bateman et al. | 407/25 |
| 4,218,159 | 8/1980 | Langen | 407/25 |

FOREIGN PATENT DOCUMENTS 20496  2/1977  Japan ................................ 407/25

Primary Examiner—Leonidas Vlachos
Attorney, Agent, or Firm—Michael J. Striker

[57] ABSTRACT

A hob for making gears comprises a cylindrical mill base and a plurality of helix-like tooth segments positioned on the surface of the mill base adjacent to each other and each having a number of tooth cutters with cutting plates of hard metal. Tooth segments may be interchangeable if they are worn out.

11 Claims, 7 Drawing Figures

$\beta = n \cdot \measuredangle (1 \pm \tan \lambda \cdot \tan \gamma)$

HOB WITH CUTTING PLATES

BACKGROUND OF THE INVENTION

The invention relates to a hob with cutting plates for making gears.

A hob is known (DE-OS No. 2 700 525), wherein the known cutting plates, which consist of hard metal, are distributed helix-like on disk-like gear rims which are provided with plane parallel front faces. Thereby, it is possible that the plate seats can be made by means of milling, so that the total tool does not have to be replaced when individual plate seats wear out, but that only individual parts have to be replaced. However, a disadvantage of the known device is that no diplacement of the individual teeth with respect to each other is possible, due to the even design of the disk-like gear rim. However, a twist like displacement of the teeth is advantageous, because a more favorable cutting ratio is obtained during the operation of the hob and also cuts more evenly if not a few or a plurality of teeth are engaged, but rather sequentially, whereby a time delay is obtained caused by the dimension of the displacement or the dimension of the twist angle $\gamma$. Basically, it is possible to provide a displacement for the sequentially engaging teeth when using disk like tooth rims which are provided with reversible cutting plates on their teeth. However, a prerequisite would be that the individual disks are not even, so that the manufacturing costs for such a hob and also the storage costs for the replacement parts would be considerably increased. In addition, the life span of the plate seats for receiving the cutting plates are different, because the tooth stresses within the engagement area are different, in particular during the rough hob milling into the full material. This can be taken into consideration in the known device by exchanging a complete disk like gear rim with another. However, this requires that the hob must be dismantled from the hob machine and must be dismantled into its individual components.

In addition, these known milling devices are only single threaded.

SUMMARY OF THE INVENTION

It is an object of the invention to provide a hob, wherein individual components with only a few teeth can be exchanged with even teeth segments in case of wear or a damage to the plate seat which receive the reversible plates, without replacing a complete gear disk of 360°, and without requiring a removal of the hob for the hob machine. In addition, it should be possible to provide a hob with twist-like displaced teeth by using even exchangeable parts.

As a solution, the invention provides that a plurality of helix-like tooth segments are provided in the milling element and are mounted in a thread-like guide of the milling element. Preferably, the tooth segments are mounted in a twist like displacement of the cutters with respect to the axis parallel directrix, whereby the individual tooth segments may be even, so that they can be exchanged against each other or with each other. This design has the advantage that individual tooth segments can be exchanged at any given location of the milling element in case of wear of one or a plurality of plate seats, without requiring a dismantling of the milling element or by completely dismantling it into its individual components. A further advantage is that when making the individual tooth segments, the plate seats are easily accessible. Therefore, short and sturdy tools may be used, so that a plate seat working is made very economical. The structure is also suitable for making a plurality of thread hobs, in contrast to the single disk known from the known device.

One exemplified embodiment of the invention is explained in the following in conjunction with a drawing.

DETAILED DESCRIPTION OF THE PREFERRED EMBODIMENTS

Figure 1:
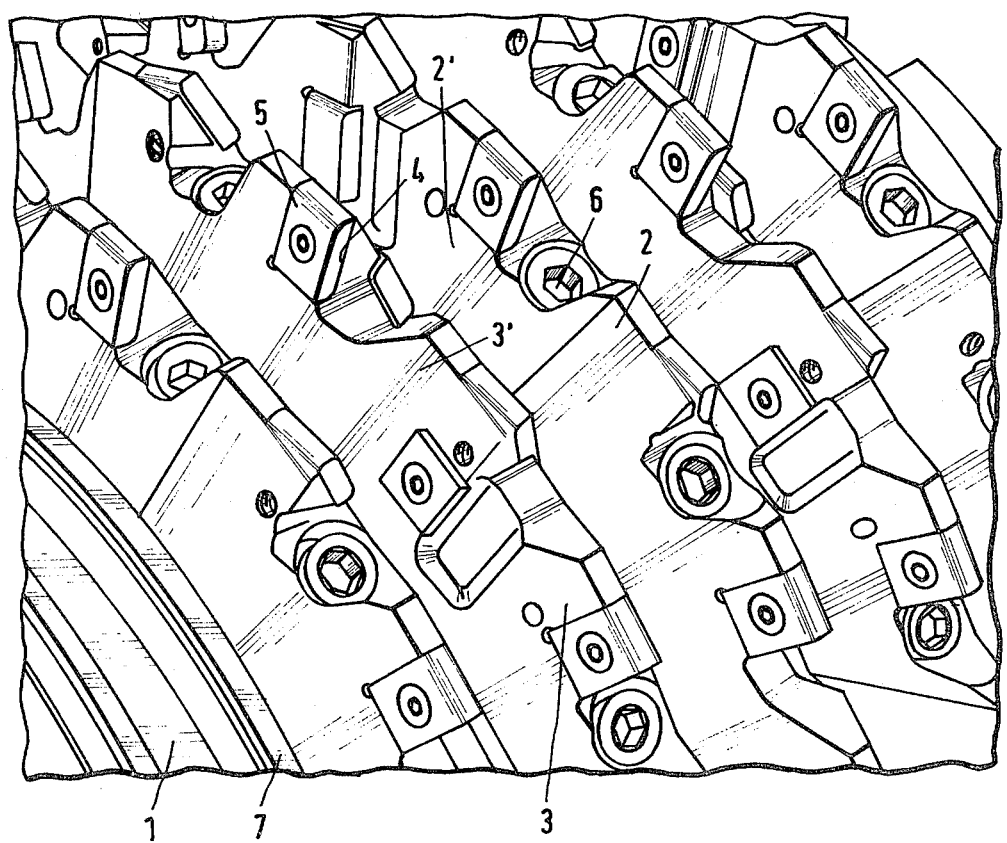
FIG. 1 is a partial perspective view of the hob according to the invention.

The hob illustrated in the drawing is provided with a milling element 1 which supports a plurality of helix like tooth segments 2,2'. The tooth segments 2,2' each support 4 teeth 3,3' which have a tooth pitch angle $\alpha$ FIG. 2. In the illustrated embodiment the segment angle $\beta$ is 81° in accordance with FIG. 2.

The individual teeth 3,3' are provided with chambers 4 which serve to receive reversible plates 5. The reversible plates 5 consist of hard metal such as Wolfram carbide, Titanium carbide and are exchangeably inserted in the chambers 4 which serve as plate seats. Of the individual teeth of a tooth segment 2 or 2', the one tooth 3 and 3' supports each two reversible plates 5 which are offset with each other in a heightwise manner and are alternately positioned with respect to the adjacent tooth 3'. In contrast thereto, the teeth 3" and 3''' support only one each reversible plate 5 on the opposite sides, as shown in FIG. 2, in particular at the right portion.

Figure 3:
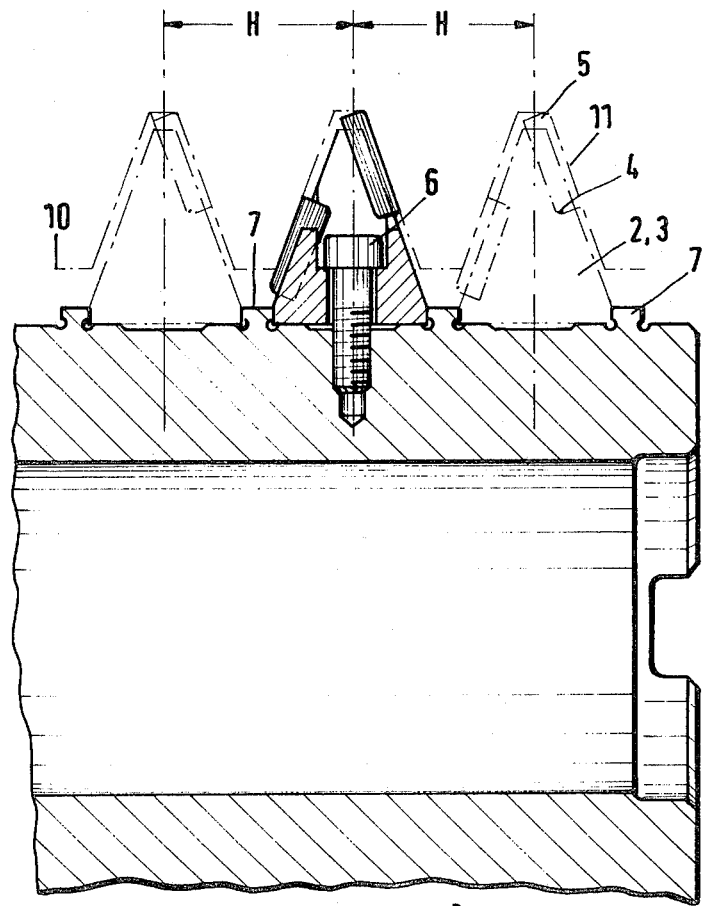
FIG. 3 is a partial longitudinal section through the hob.
Figure 5:
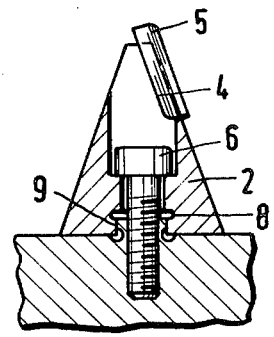
FIG. 5 is a partial cross section through a tooth segment.

The mounting of the tooth segments 2,2' on the milling element 1 is carried out by radially extending screws 6, whereby always two screws are provided for mounting a tooth segment 2 or 2'. In addition, the mounting of the tooth segments 2 in the embodiment of FIG. 3 is carried out by helix like guide ribs 7 of the milling element 1 which support the tooth segments 2 at their outer faces. In a deviating embodiment in accordance with FIG. 5, the individual tooth segments are provided with a centered helix like guide groove 8 at their bottom, into which a helix like guide rib 9 of the milling element engages. In both embodiments, the possibility exists to remove a tooth segment 2 radially from milling element 1, after removing a screw 6, without dismantling the hob or without removing it from the hob machine.

Figure 2:
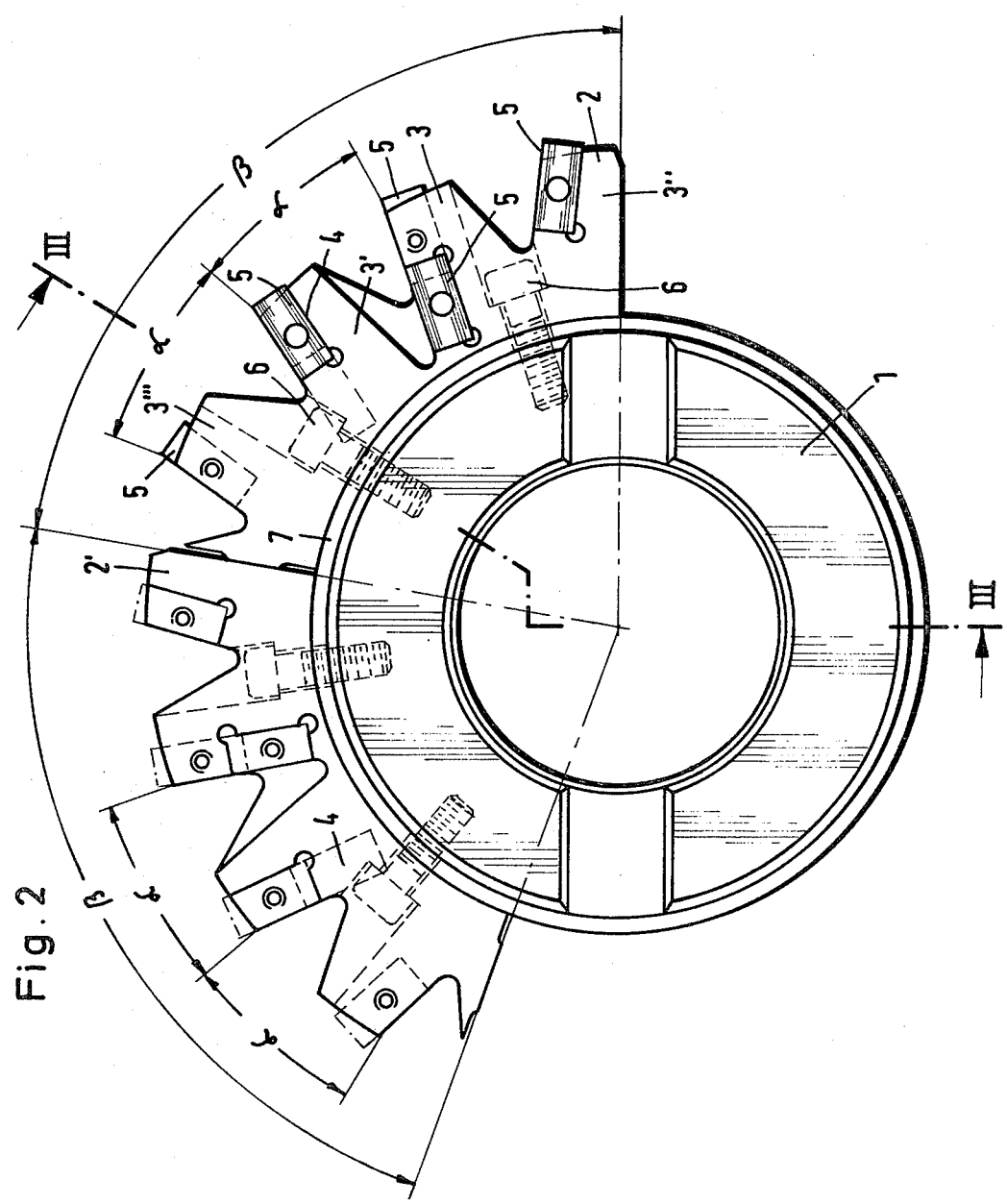
FIG. 2 is a partial front view of the hob.
Figure 4:
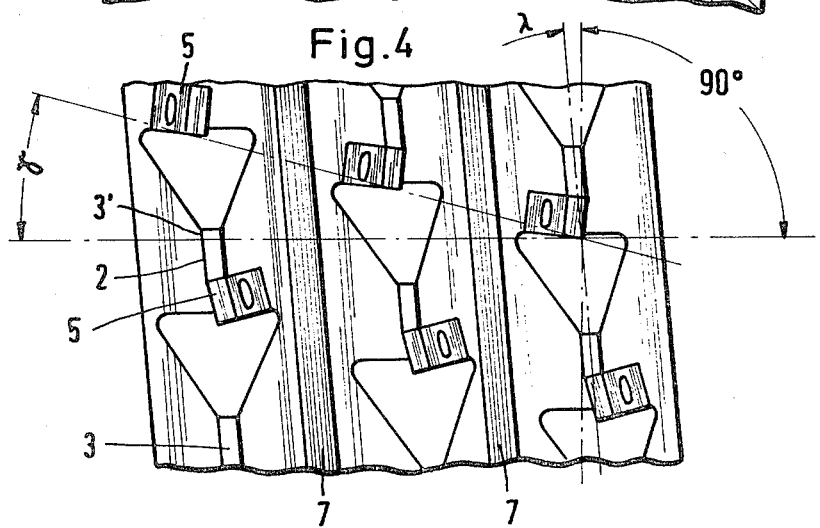
FIG. 4 is a partial plan view of the hob.

If a segment angle $\beta$ is chosen, taking into consideration the equation $$\beta = n \times \alpha(1 \pm \tan \times \lambda \tan \gamma)$$

wherein n corresponds to the number of teeth of a segment, one obtains a teeth displacement in accordance with FIG. 4 wherein the hob pitch angle $\lambda$ is entered, as well as the twist angle γ, when using teeth segments in accordance with FIG. 2. From the drawing it can be seen that the milling screw in accordance with FIGS. 1,3 is single threaded and corresponds to the calculated hob pitch H. Due to the suitable determining of the segment angle β, the head cutters of adjacent gears of the hob engage sequentially in a twist-like manner, as can be seen particularly in FIGS. 1 and 4. Thereby, a stable running is favored during the cutting operation, also when using even tooth segments 2. In addition, the plate seats or chambers 4 are easily accessible for receiving the reversible plates 5, so that a particular economical after working is made possible.

The work piece to be worked is designated with the numeral reference 10 in FIG. 3, wherein it is clearly seen how far the reversible plates 5 extend beyond the teeth 3 of a tooth segment 2, so as to make the reference profile 11 of the workpiece 10 to be milled, as shown in the dash-dotted lines.

Figure 6:
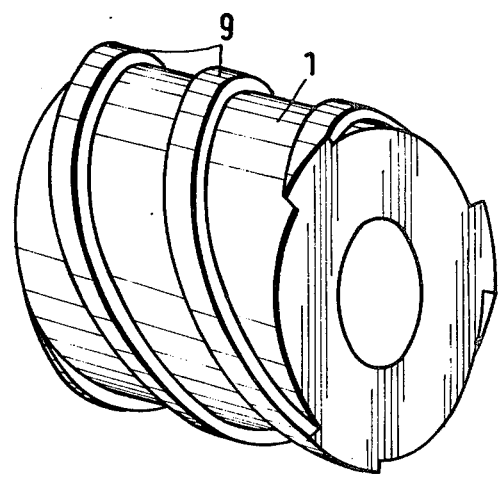
FIG. 6 a three thread milling base element in a perspective view.
Figure 7:
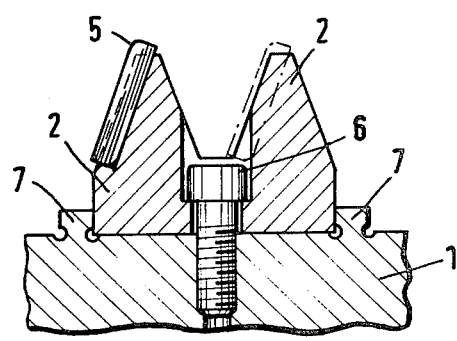
FIG. 7 is a section through a tooth segment with two rows of teeth for a two thread milling device.

Instead of a base element with a plurality of threads 9 in accordance with FIG. 6, tooth segments may be provided with more than one row of teeth, so that a multiple thread hob is provided in accordance with FIG. 7.

It will be understood that each of the elements described above, or two or more together, may also find a useful application in other types of hobs with cutting plates differing from the types described above.

While the invention has been illustrated and described as embodied in a hob with cutting plates, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hob for making gears, comprising a cylindrical base element; a plurality of even, helix-like tooth segments mounted on said base element and each carrying a number of tooth cutters with reversible cutting plates thereon; means for mounting the cutting plates on the tooth cutters; said base element being formed with a plurality of helix-shaped guide means, said segments being mounted in said guide means; and means for mounting the segments in said guide means, said segments being arranged in adjacent parallel rows on said base element, the cutters of the segments positioned in adjacent rows being displaced in a twist-like manner relative to an axis parallel directrix of the base element.

2. The hob as defined in claim 1, wherein each of said tooth segments extends over said base element at a segment angle which is not integrally divisible at 360°.

3. The hob as defined in claim 1, wherein at least one tooth cutter in each tooth segment supports two reversible plates and at least another one tooth cutter in each tooth segment supports only one reversible plate.

4. The hob as defined in claim 3, wherein each cutter has a head and a foot, all the cutters in each segment having cutting reversible plates at their heads and some of the cutters having additional cutting reversible plates at their feet.

5. The hob as defined in claim 4, wherein at least two adjacent cutters in each segment have cutting reversible plates at their heads and their feet, the cutting reversible plates in said adjacent cutters being arranged in alternating sequence.

6. The hob as defined in claim 1, wherein said guide means include helix-like guide grooves provided in each tooth segment at the center of its bottom and helix-like guide ribs formed on said base element, the respective guide ribs engaging into the respective guide grooves.

7. The hob as defined in claim 1, wherein said guide means include at least a pair of helix-like guide ribs spaced from each other to support a respective tooth segment therebetween by lateral faces of said ribs.

8. The hob as defined in claim 1, wherein said means for mounting the tooth segments with the base element are screws, said screws extending radially to an axis of said base element.

9. The hob as defined in claim 1, wherein said tooth segments are interchangeable.

10. The hob as defined in claim 1, wherein said cutting plates in said cutters are interchangeable.

11. The hob as defined in claim 1, wherein said tooth segments each support more than one row of the tooth cutters.

* * * * *